Dec. 2, 1941.　　　　R. BLAKELY　　　　2,264,612
RECORD CONTROLLED MULTIPLYING MACHINE
Filed Nov. 12, 1938　　　9 Sheets-Sheet 1

INVENTOR
Robert Blakely
BY
Cooper, Kerr & Dunham
ATTORNEYS

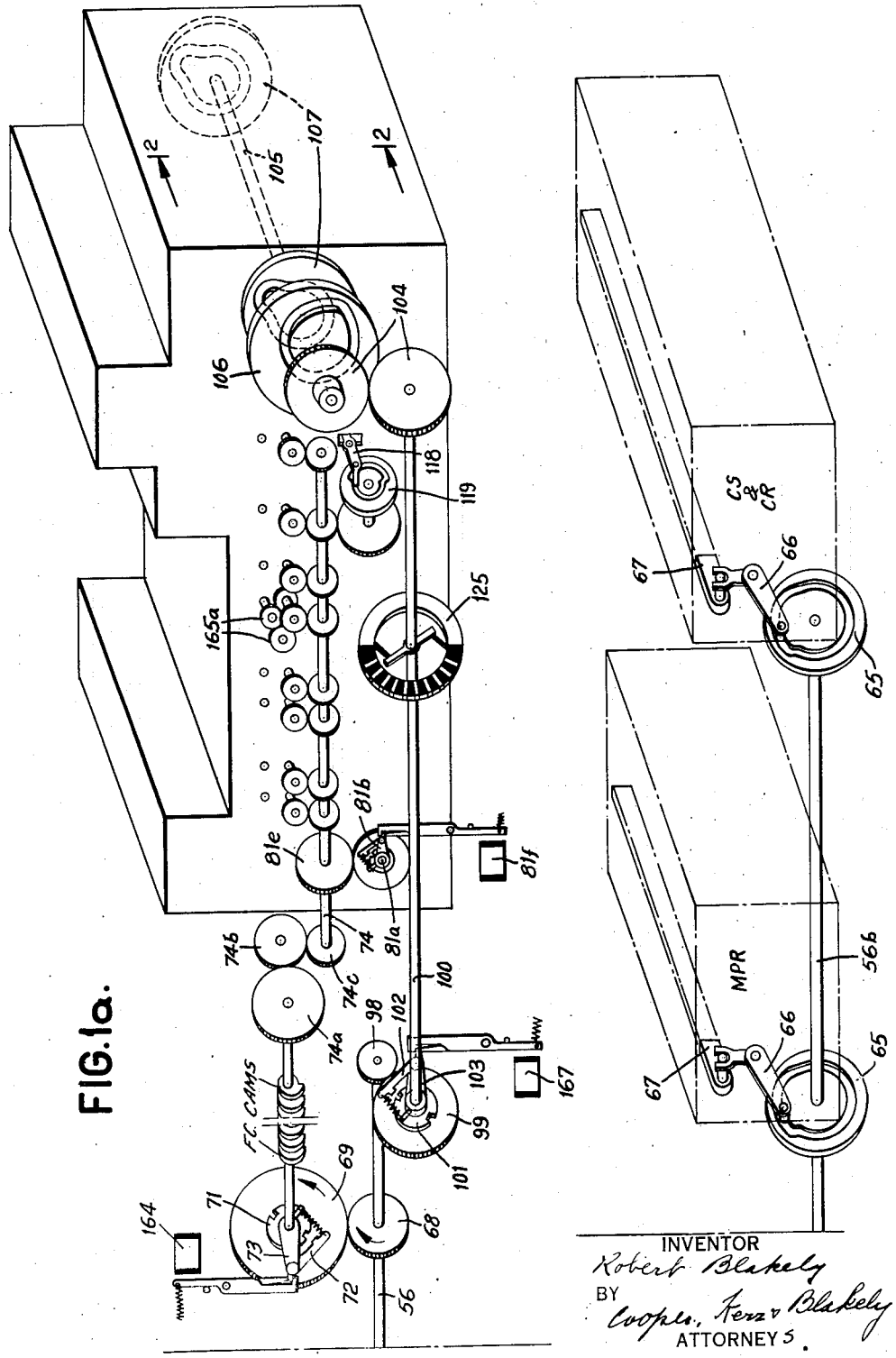

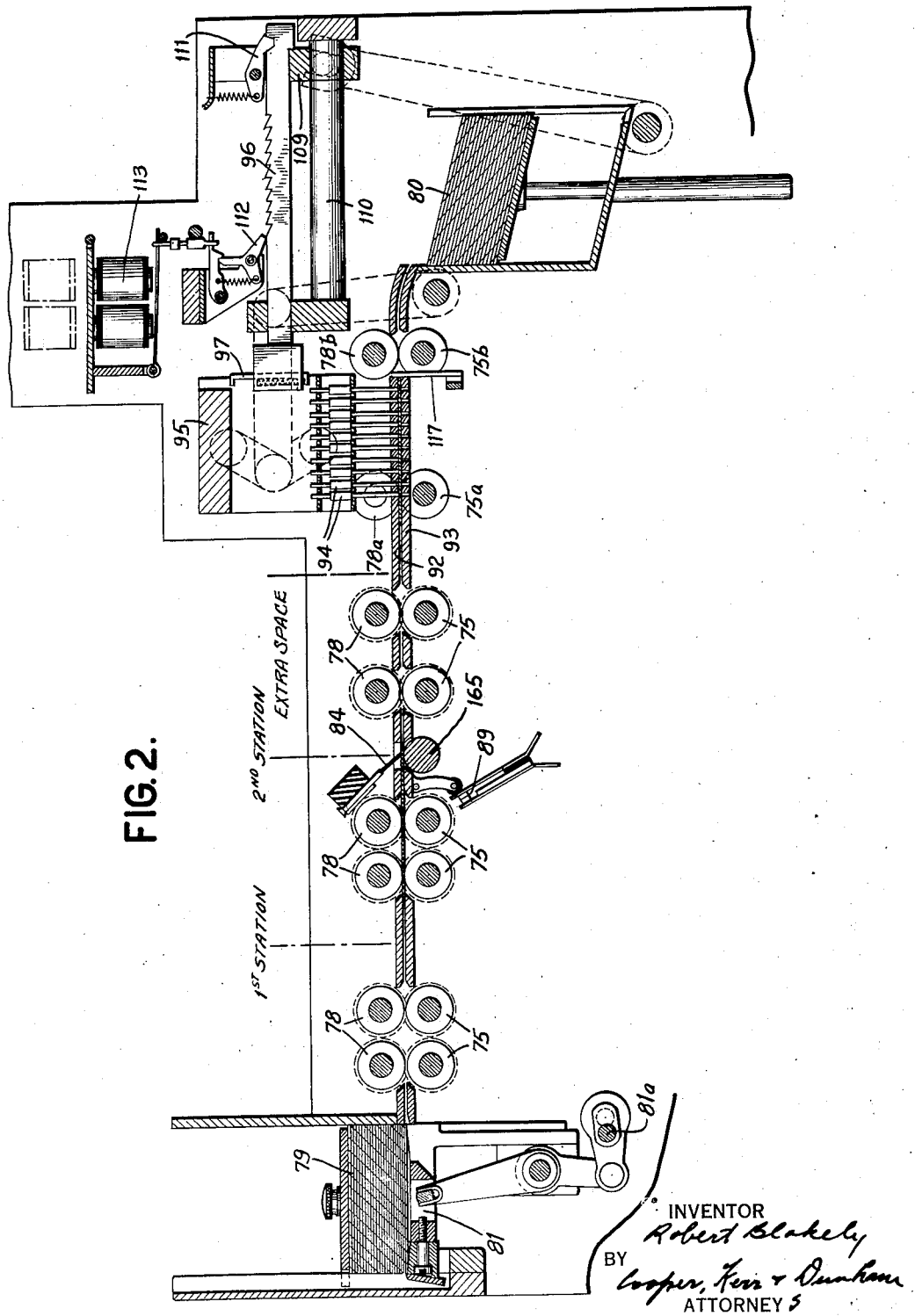

Dec. 2, 1941. R. BLAKELY 2,264,612
RECORD CONTROLLED MULTIPLYING MACHINE
Filed Nov. 12, 1938 9 Sheets-Sheet 4

INVENTOR
Robert Blakely
Cooper, Kerr & Dunham
ATTORNEYS

Dec. 2, 1941.  R. BLAKELY  2,264,612

RECORD CONTROLLED MULTIPLYING MACHINE

Filed Nov. 12, 1938  9 Sheets-Sheet 5

INVENTOR
Robert Blakely
BY
Cooper, Kerr & Dunham
ATTORNEYS

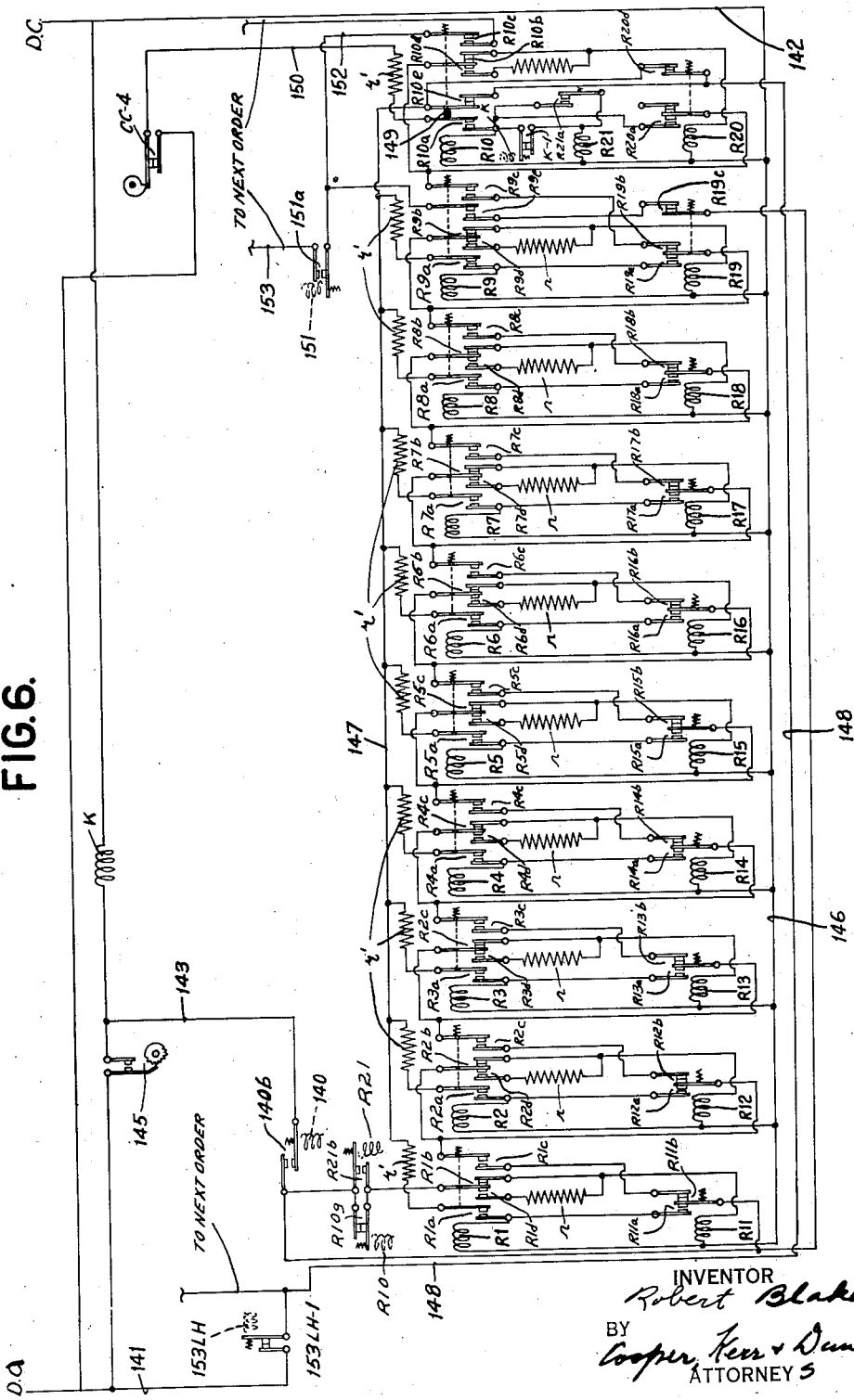

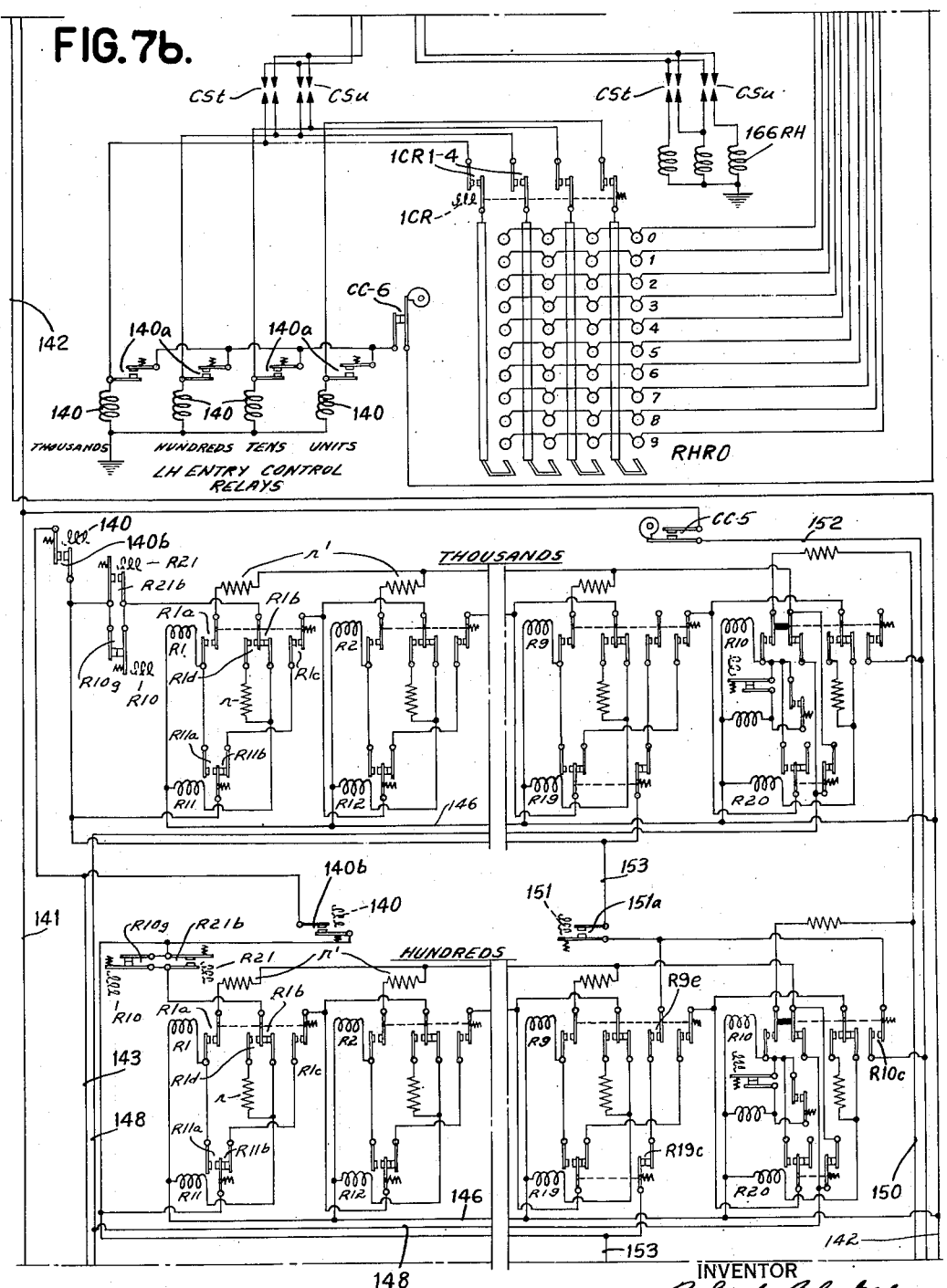

Dec. 2, 1941.   R. BLAKELY   2,264,612
RECORD CONTROLLED MULTIPLYING MACHINE
Filed Nov. 12, 1938   9 Sheets-Sheet 9

Patented Dec. 2, 1941

2,264,612

UNITED STATES PATENT OFFICE 2,264,612

RECORD CONTROLLED MULTIPLYING MACHINE

Robert Blakely, Ridgewood, N. J., assignor to International Business Machines Corporation, New York, N. Y., a corporation of New York Application November 12, 1938, Serial No. 239,979

6 Claims. (Cl. 235—61.10)

This invention has for its object, the provision of an improved record controlled multiplying accounting machine which will have higher overall speed of operations than previous machines of this type.

More particularly, the present invention relates to the provision of improvements to enable the supplemental machine cycle required for reset of the final result accumulator to be dispensed with whereby one machine cycle per record may be eliminated. In this way higher card output is attained per unit of time with maintained operating speed of the units of the machine.

Record controlled machines as heretofore constructed required that a special complete machine cycle intervened following result recording before the beginning of computing pertaining to a following record. Resetting of the final result accumulator was effected mechanically and such mechanical reset required a complete machine cycle to effect reset. However, by employing a relay type of accumulator for the final result accumulator, reset or more exactly clearing of such accumulator may be effected practically instantaneously and by providing such a type of accumulator and proper time controls for clearing it, it is possible to obtain clearing at the end of the cycle in which result recording is effected and during the same cycle.

Further objects of the present invention reside in the provision of such a form of final result accumulator and in the provision of proper controls for clearing the accumulator in a record controlled multiplying accounting machine to the general end that operating time of such machines may be saved.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

In the drawings:

Figures 1 and 1a, taken together, with Fig. 1a to the right of Fig. 1, show the diagrammatic view of the various units of the machine and their driving devices;

Fig. 2 is a transverse sectional view of the card handling, reading and punching section of the machine. This section is taken substantially on line 2—2 of Fig. 1a;

Fig. 6 is a wiring diagram of part of an electric type of accumulator which is used in one of the accumulating units of the machine; and Figs. 7a, 7b and 7c, taken together and arranged vertically in the order named, show the complete circuit diagram of the machine.

Figure 1:
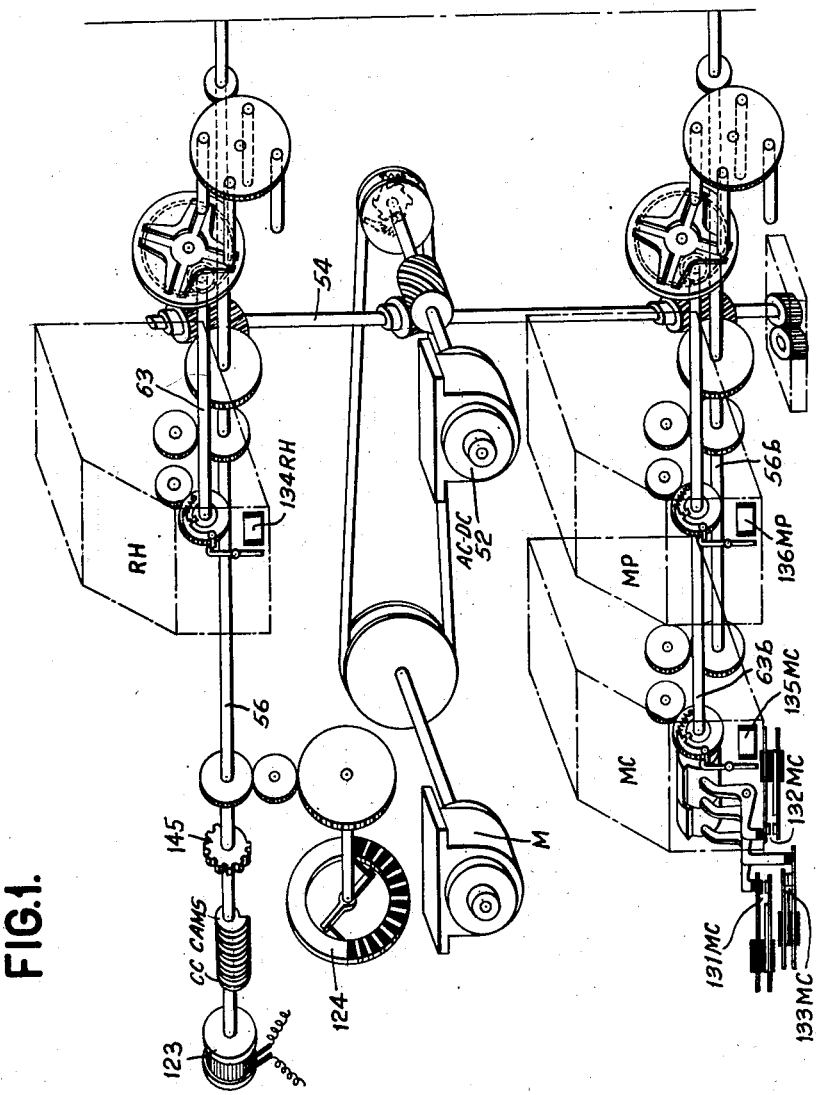

In general the card handling, reading and punching section of the machine is similar to that shown in Bryce United States Patent No. 2,106,477. The card feed, card handling and punching section is shown in the upper right hand corner of Fig. 1a. It is also shown in transverse cross-section in Fig. 2. The punching mechanism is of the gang punch type.

The machine also includes a number of accumulators and entry receiving devices as follows. In the upper part (see Fig. 1) there is an RH accumulator which is of the customary mechanically driven electromechanical type. In the lower part of the machine there is an MC and MP receiving device. These accumulators are driven in the customary manner. The machine is also provided with a multiplying panel relay unit generally designated MPR in Fig. 1a and there is also a column shift and control unit designated CS and CR.

Machine drive

The machine is driven by a constantly running motor M which drives an A. C.-D. C. generator 52. The usual vertical drive shaft 54 is provided which drives the upper counterdrive shaft 56 and the lower counterdrive shaft 56b in the customary manner. The usual Geneva reset drive is also provided for the upper reset shaft 63 and for the lower reset shaft 63b. The lower drive shaft 56b also extends to the right (see Fig. 1a) and drives operating cams 65, which operate bell crank follower members 66 and slidably shift serrated operating bars 67 for the multi-contact relay devices. The entry receiving devices for the multiplier and the multiplicand and the RH product accumulators are of the usual type as customarily used in tabulating machines and are provided with electromagnetically operated clutches. Such RH accumulator and the MP and MC entry devices have readout devices of the customary type such as those described in United States Patent to Daly et al. No. 2,097,145. The multiplying relays and column shift relays are of the customary electromechanical type, for example they may be of the type shown and described in the United States Patent to Bryce, No. 2,106,477 (see Figs. 4 and 5), and they may be of the type shown in United States Patent to Daly et al. No. 2,097,145.

*Card feed, reading and punching unit and drive therefor*

Figure 3:
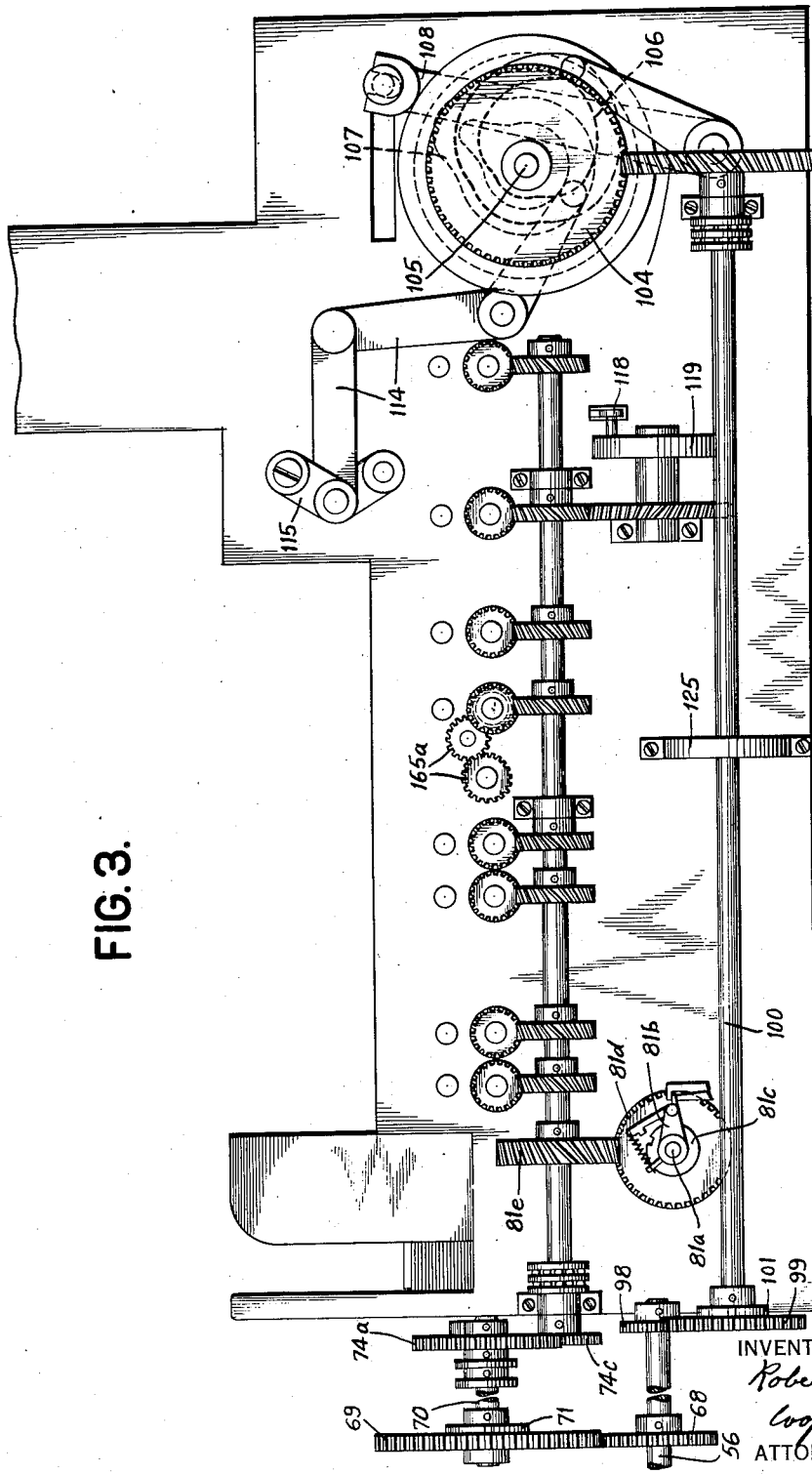
Fig. 3 is a front elevational view of the card handling, reading and punching section of the machine.

Referring to Figs. 1a and 3, the shaft 56 at its extreme right hand end is provided with a gear 68, which drives a gear 69 freely rotatable upon a shaft 70 but having fast to it a notched element 71 of a one revolution clutch. The driving relation between 69 and 68 is one to two. In this respect the drive differs from the one to one drive of the machine shown in Bryce Patent No. 2,106,477. The complemental part of the one revolution clutch comprises a pawl 72 carried by an arm 73, which is fast to shaft 70. This one revolution clutch is clutched up on energization of magnet 164. A number of FC cam contact devices, viz. FC—2, FC—4, FC—6, FC—7, FC—8 to FC—11 inclusive, are provided driven by the shaft 70. A drive shaft 74 is driven through reducing gearing 74a, 74b and 74c from shaft 70. A driven ratio of the reducing gearing provides a one to two drive between 70 and 74. Accordingly, the counterdrive shaft 56 rotates in unison with the drive shaft 74 and the cam contact drive shaft 70 makes one revolution for two revolutions of shaft 56 and shaft 74. The usual spiral gearing drives the lower feed rolls 75, 75a, 75b (see Fig. 2). The contact roll 165 is gear driven from one of the rolls 74 by the gearing generally designated 165a (Fig. 3). The upper feed rolls 78, 78a and 78b are also provided, driven in the customary manner. Preferably the rolls 75a and 78a and 75b and 78b are arranged to rotate at a slightly higher rate of speed than rolls 75 and 78. This drive is provided so that the rolls 75a and 78a will positively drive a card against a card stop 117. Upon withdrawal of the card stop after punching, the card will be ejected from the punching die by the rapidly moving rolls 78b and 75b and be delivered to the discharge stack. The machine is provided with a card supply magazine 79 and the usual discharge hopper 80. A conventional picker 81 is provided. This is crank operated in the usual way from shaft 81a. A one revolution picker clutch is provided (see Figs. 1a and 3). This picker clutch includes an element 81c fast to spiral gear 81d driven from a spiral gear 81e fast upon shaft 74. The one revolution picker clutch has the customary pawl adapted for release upon energization of a picker clutch magnet 81f. This picker clutch is provided in order that a card may be picked from the magazine in the first machine cycle of a card feed cycle, which includes two machine cycles, i. e. two revolutions of counterdrive shaft 56.

The card reading section of the machine comprises a single set of sensing brushes designated 84 (Fig. 2). There is also provided a single set of card lever contacts 89.

The punch section comprises a punching die with upper and lower die plates 92 and 93. Sets of punches 94 are provided suitably supported for sliding movement in a punch operating frame generally designated 95. There are also the customary interposer selector bars 96 each having a punch operating plunger 97, which plunger slides over the tops of the punch 94 and over the top of the punch operating frame 95.

The drive for the punching section of the machine will now be described. Referring to Figs. 1a and 3, the shaft 56 is provided with a gear 98 which in turn drives a gear 99 freely rotatable on a punch operating drive shaft 100. Gear 99 has fast to it a notched element 101 of a one revolution clutch and the complemental part of this clutch includes pawl 102 carried by arm 103 which is fixed to shaft 100. This one revolution clutch is of the customary type and is engaged upon energization of punch clutch magnet 167. When the clutch is engaged, the shaft 100 is turned through one complete revolution upon two revolutions of the counterdrive shaft 56. In view of this two to one driving ratio, the notched element 101 is provided with two notches to receive pawl 102 in either of two positions. Shaft 100 through spiral gear 104 (see Figs. 1a and 3) drives a cam shaft 105. This cam shaft is provided with an interposer cam 106 and punch operating cams 107. Interposer cam 106 is adapted to shift a crank follower 108 and in turn shift a cross bar 109 back and forth on slide rods 110 (see Fig. 2). Interposers 96 are impositively driven from the cross member or bar 109 in any suitable manner as by spring pressed pawls 111. The interposers are selectively positioned over the punches by means of pawls 112 which engage ratchet teeth in the top of the interposer bars. Interposer pawls 112 are tripped by punch selector magnets 113. After one or more of the interposer bars have been selectively positioned under the control of the punch selector magnets, the punches which are under the ends of the operating plungers 97 will be positively forced through the card by means of the punch operating cams 107 (see Fig. 3). The cam followers co-operating with 107 shift linkage 114 which on shifting is adapted to operate a suitable operating means for the punch frame 95. This operating means is here shown as comprising a toggle 115.

Figure 4:
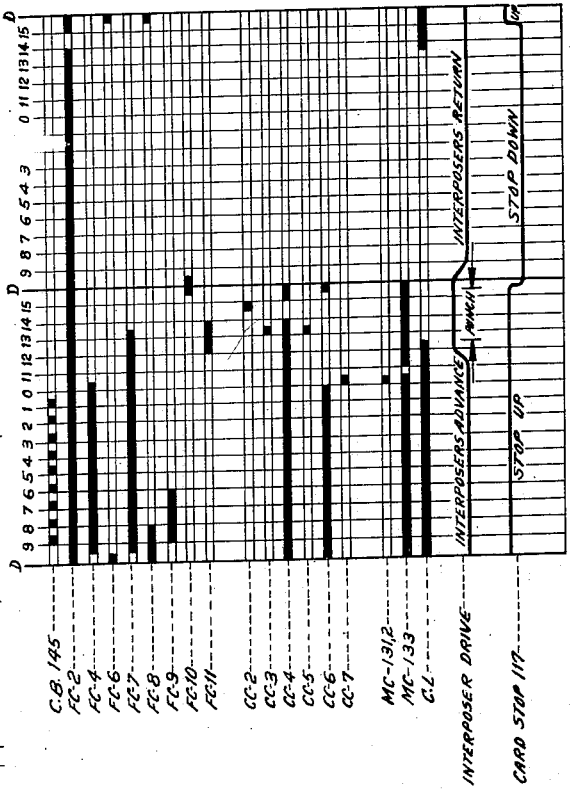
Fig. 4 is a cam timing diagram.

Referring to Fig. 2, it may be explained that it takes two machine cycles to bring a card from the card magazine 79 to a position in which the card is about to be read by the sensing brushes 84 at the second station. On the following machine cycle the card is traversed by the brushes 84 and advanced to an extra space between the sensing brushes and recording mechanism and on the following machine cycle, but in the same card feed cycle, the card which has been traversed past the brushes 84 will be fed into the punching dies. The card is arrested in the punching die by means of the card stop 117, which stop cooperates with the pivoted arm 118 (see Fig. 1a) coacting with box cam 119 driven by gearing affording a one to two drive from shaft 74. The configuration of the box cam is such as to provide the card stop movements shown on the timing diagram (Fig. 4). With the card stop 117 elevated, the card will be arrested in the proper position in the punching die to be punched. Upon withdrawal of the card stop the card will be ejected from the punching die by roll 78b and 75b and delivered to the discharge stack.

*Emitters and cam contacts*

The main drive shaft 56 is adapted to drive cam contacts CC—2 to CC—7 inclusive and an impulse distributor 123 (see Fig. 1). A circuit breaker 145 is also affixed to this shaft. The emitter 124 is provided driven from shaft 56 in the customary manner. There is also provided an emitter 125 for the punch magnets. This emitter is driven from the punch driven shaft 100 (see Fig. 1a).

Reset control contacts

Referring to Fig. 1, the MC receiving device is provided with a cam which upon reset, is adapted to close normally opened contacts 131MC and 132MC and to open normally closed contacts 133MC. These contacts all shift to reverse position upon reset of the MC receiving device. The customary electromechanical reset is provided for the RH accumulator, the MC and the MP entry devices. The reset magnets for these accumulators are shown on Fig. 1 and comprise magnets 134RH, 135MC and 136MP.

Before describing the circuit diagram, certain timing conditions will be explained, both with reference to the present machine and with reference to prior art machines. In prior record controlled multiplying machines utilizing a successively acting type of punch, see for example, Daly Patent No. 2,097,145, the sequence of machine cycles for a multiplication is as follows. The first machine cycle is an MC and MP entry cycle, which also comprises the RH reset cycle. This machine cycle is also utilized for punching and the following machine cycle is also utilized for punching. In some instances with such prior machines, more than two machine cycles may be required for punching. With prior machines when punching is completed, the next machine cycle is an LH reset cycle. There then follows one or more multiplying cycles or partial product entering cycles. Thereafter there is an RH to LH transfer cycle and in this same cycle the MP and MC receiving devices are reset. With such a machine, assuming two machine cycles for punching and two significant digits in the multiplier, the total number of machine cycles required for card handling, computing and punching, comprises six machine cycles.

Consider now the foregoing machine to be modified to employ a gang type of punch. With such a type of punch, punching may be invariably effected in one machine cycle. Accordingly, the overall machine cycles may be reduced by one, since punching may be effected in the MC and MP entry cycle and LH reset may immediately follow in the next ensuing machine cycle. Previous types of record controlled multiplying machines utilized an electromechanical type of LH accumulator and accumulators of this sort required a whole machine cycle for effecting resetting.

According to the present invention a different type of accumulator is provided for receiving LH components of products. This different type of accumulator, in lieu of being of electromechanical type is a relay type of accumulator. When a relay type of accumulator is utilized, such form of accumulator may be reset in the same machine cycle in which amounts are being read out from the accumulator. Reset may be effected electrically and practically instantaneously and such reset may occur following readout and in the same machine cycle. By utilizing such a form of relay type of accumulator for receiving the LH components of products and also the transfer components which are received from the RH accumulator, machine operating time may be saved, since the separate LH reset cycle required for prior machines may be dispensed with.

Figure 5:
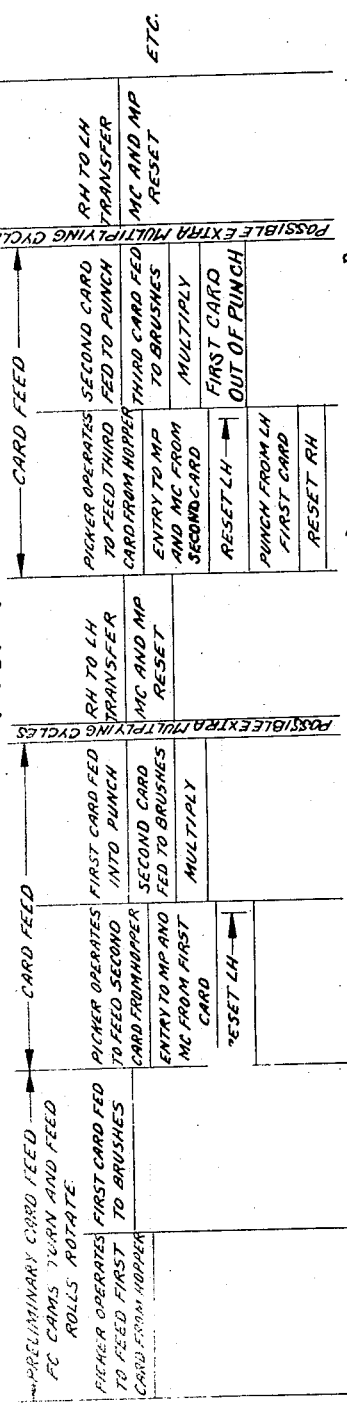
Fig. 5 is a sequence timing diagram.

The foregoing will be clear by referring to Fig. 5. Here it will be noted that LH reset occurs in the first machine cycle of the card feed cycle and at the end of such cycle. As also shown on Fig. 5, see the right hand portion of the diagram, LH reset occurs in the same machine cycle with punching.

Relay type final result accumulator

The relay type of accumulator which is here employed for the final result accumulator is of the form shown and fully described in copending application of James W. Bryce, Serial No. 214,930, filed June 21, 1938.

In general the accumulator comprises sets of companion relays in each order adapted to be energized successively according to multiple impulses representing differential values entered therein. Each set of relays, representing an ordinal value or digit position comprises a control relay and a companion relay, the sequence of energization being such that, upon entry of an impulse, the control relay is first energized and this in turn causes its companion value relay to become energized. The value relay, immediately upon being energized, conditions the control relay of the next higher set in the series for operation upon entry of the next impulse. At completion of the first impulse the operated control relay is deenergized. Succeeding impulses cause similar operations of further sets of relays in the series and the value relays thus energized are maintained in their operative condition until a predetermined ordinal value position is reached, at which time the maintaining circuit to all value relays is broken. An electrical carry means is utilized to enter a carry impulse in the next higher orders of the accumulator as the relay progression in lower orders pass from the highest digit position to the zero position. A simple readout means is provided which operates under the control of the last operated relay to complete circuits to the punch selector magnets on a punching cycle.

The final result accumulator is composed entirely of relays and associated contacts for each denominational order (Fig. 6) of the accumulator. Twenty-one relays are provided, two for each digit, except the zero digit position, which requires three relays for reasons to be described later. The relays are connected by electrical circuits so as to form a series of sets of relays, each set comprises value corresponding relays paired with a controlling relay and represents an ordinal value or digit position. In the circuit diagram of the machine (Figs. 7b and 7c), four denominational orders of the final result accumulator are shown for purposes of illustration. These orders are designated as "units," "tens," "hundreds," and "thousands" orders. The relay arrangement in each of the orders is similar so that the structure of the units order as shown in Fig. 5 is representative of the structures in the other orders. When an entry is being made into the LH accumulator, that is, either a partial product entry or a transfer entry, the one or more of control relays 140 (Fig. 7b) will be energized at different times. Each of the relays 140 are provided with stick contacts 140a, the stick being completed through cam contacts CC—6. A relay 140 once energized is maintained energized to the zero index point time in the cycle.

Consider now an entry in the units order of the accumulator shown in Fig. 6. Energization of a magnet 140 related to this order will occur at a differential time in the cycle and cause an entry circuit to be completed as follows: From DC supply line 141 (Fig. 6), through the circuit breaker 145 which closes at each index point, to a line 143, thence through the relay contacts 140b now closed, contacts R10g (Fig. 6), value relay contacts R1b, entry control relay coil R11, via conductor 146, to the other side of line 142, thus energizing the control relay R11. Contacts R11a will close and thereby establish a circuit to energize value relay R1 from line 141, circuit breaker contacts 145, relay contacts 140b, contacts R11a now closed, relay coil R1, to line 142. With relay R1 energized, contacts R1a will close and provide a holding circuit from line 142, via wire 146 to relay coil R1, contacts R1a now closed, resistance r', via wire 147 to contacts R10e, or R20d, conductor 148, relay contacts 153LH—1 to line 141.

Upon energization of the value relay R1, the R1d contacts also close. These contacts are of the type known as "make before break" contacts, that is, contacts R1d will become closed before the normally closed contacts R1b open. Thus when the R1d contacts close, relay R11 is momentarily energized by the circuit which was described for its initial energization. The circuit is slightly altered now, however, by the fact that resistance r has been brought into the circuit in series with R11 and the circuit now passes through contacts R1d instead of contacts R1b. Resistance r is of such value that it will allow the entry control relay R11 to remain energized and will keep R11a closed until the circuit breaker contacts 145 open at the end of the impulse, at which time relay coil R11 is de-energized. Upon entry of the next impulse, resistance r limits the flow of current through coil R11 to a value below that necessary to re-close contacts R11a. So long as resistance r is in series with the now de-energized R11 relay coil, the contacts controlled by this coil will remain in their normal position. Another resistance designated r' is provided in the holding circuit for relay R1 to prevent a potential holding circuit for the R11 relay coil that would otherwise be established upon the closure of contacts R1a. This potential circuit may be traced as follows: Line 142, conductor 146, relay coil R11, resistance r, contacts R1d now closed, contacts R10g, contact R11a also closed, then to line 141, through the remainder of the holding circuit for the R1 relay as previously described. The resistance r', however, being in series with the circuit just described, is of such value that when combined with resistance r it will limit the holding current to relay coil R11 and at the time circuit breaker contacts 145 open after the first impulse the relay R11 will be de-energized, causing its contacts to be restored to normal. Contacts 140b will provide a circuit from the breaker contacts 145 into the accumulator from the time relay 140 is energized until the end of the adding operation, each relay 140 being maintained energized by cam contacts CC—6 previously mentioned. It will be apparent that after relay 140 becomes energized to condition an accumulator entry circuit, the number of index points remaining up to zero, will determine the number of impulses from the circuit breaker contacts 145 which will be permitted to enter the accumulator to cause successive energization of the relays. For illustrative purposes a specific entry into the units order will now be described.

Assume for example that a value of 5 representing a partial product impulse or a transfer impulse is to be entered at the 5 index point in the machine cycle. The adding control magnet 140 associated with the units order will be energized at the 5 index point as previously described. There are then remaining five index points from "5" to "0." The circuit breaker contacts 145 will make at 5, 4, 3, 2 and 1 in the entry cycle to send successive adding impulses to the units order. The action of the first impulse has already been described. The second impulse to enter the accumulator is initiated at the "4" index point. Contacts 140b are still closed and a circuit is provided to entry control relay R12 as follows: From line 141, circuit breaker contacts 145, contacts 140b now closed, contacts R11b in the position shown, contacts R1c now closed, contacts R2b in the position shown, relay coil R12 to line 142. Relay R12 is thus energized and closes its contacts R12a to provide a circuit to energize value relay R2 in a manner similar to that described for the energization of value relay R1. Relay R12 will become de-energized when the circuit breaker contacts open the circuit to this coil at the end of the impulse which caused its energization.

It will be apparent from the foregoing explanation that each additional impulse entering the accumulator units order causes the energization of a new value relay, that is, the first impulse caused the energization of relay R1 and the second impulse relay R2, etc. Such energization of relay R2 was dependent upon the fact that relay R1 remained energized, its R1c contacts being in series with the circuits which energized relay R12 and then relay R2. In like manner when a third impulse enters the units order of the accumulator, it passes through contacts R1c, and R2c now closed and results in the energization of relay R3 in a manner similar to that described for the previous value relays in the series. Thus at the end of a fifth impulse relays R1 to 5 would be energized to represent that "5" had been entered into the units order of the accumulator.

The operation of the series of impulses for the first nine impulses entered is the same as described above, thus at the end of the ninth impulse relays R1 to R9 remain energized. These relays are maintained energized by a circuit through normally closed R10e and R20d contacts as previously explained. Upon entry of a tenth impulse, however, a somewhat different series of events occur, a circuit to energize entry control relay R20 is provided as follows: Line 141, through circuit breaker 145, contacts 140b now closed, contacts R11b, contacts R1c, contacts R12b, contacts R2c, contacts R13b, contacts R3c, etc., to and through contacts R9c, contacts R10b, relay coil R20 to line 142. Relay R20 upon being energized causes contacts R20a to close and a circuit is thereby completed to the zero value relay designated R10. This circuit is as previously traced through contacts R11b, R1c, R12b, R2c, etc., * * * through contacts R9c, contacts R20a now closed, relay coil R10 to line 142. Contacts R20d which are in parallel with the R10e contacts are now open. Contacts R10a and R10e are of the "make before break" type and are tied together by means of an insulating portion 149, that is, contacts R10a are designed to close before contacts R10e open. Therefore, upon energization of relay R10, contacts R10a will close providing a holding circuit for relay R10 from line 142, through relay coil R10, contacts R10a, resistance r', conductor 150 and cam contacts CC—4 to line 141. The timing of cam contacts CC—4 is such as to maintain relay coil R1Q energized until the fourteenth index point in the machine cycle at which time carrying operations will have been completed. After contacts R10a have closed, contacts R10e will open and since contacts R20d are already open as previously described, the holding circuit for the value relays R1 through R9 is now broken and these contacts are returned to their normal positions.

Contacts R20d are placed in the circuit to bypass the R10e contacts for the purpose of re-establishing the holding circuit for relay R1 through R9 immediately after it is broken by the opening of the R10e contacts. The de-energization of relay R20 upon the termination of the tenth impulse allows contacts R20d to close and perform their function as above described so that after the next impulse and succeeding impulse, the value relays successively energized by these impulses will have a holding circuit to maintain them energized in a manner already described. Contacts R10e are held opened by the energized R10 relay for an appreciable time, which would allow the next impulse to enter the accumulator to energize the R1 relay, but would not allow a maintaining circuit for this relay to be established except for the presence of the R20d contacts which complete the circuit in time to take care of this condition.

Re-energization of relays R11 and R1 from the tenth impulse must be prevented. This condition would be likely to occur just after the R20d contacts had re-established the holding circuit for relays R1 to R9, except for the fact that contacts R10g are provided. As soon as relay R10 became energized, contacts R10g opened and prevented the completion of an entry circuit to energize relays R11 and R1.

It will be noted that a K relay is also provided and connected to the common side of circuit breaker contacts 145. Each impulse from the circuit breaker contacts 145 will cause the K relay to be energized by a circuit from line 141, through the circuit breaker contacts 145, conductor 143, relay coil K to line 142. Once relay K is de-energized following the opening of contacts R10e, the entry circuit for energizing the accumulator relays may be re-established. This is brought about by the closing of the contacts R21b in the following manner. With relay R10 energized when contacts K1 re-close, the relay R21 will be connected in parallel with relay R10 and also become energized. At the time relays K and R20 were first energized, the relay R21 cannot pick up because the contacts K1 are adjusted to open before the contacts R20a close to allow a circuit to be completed to the R10 relay. Relay R21 remains energized until relay R10 becomes de-energized. This condition is obtained by the shunt circuit provided around the K1 contacts which shunt circuit is established by the R21a contacts.

The sequence of events which occurs upon the entry of a tenth impulse into an order of the impulses may now be briefly summarized. Relays R1 to R9 will be energized prior to the tenth impulse, upon entry of the tenth impulse relays K and R20 are energized concurrently, but the K1 contacts open before the R20a contacts and relay R10 is energized. The energization of relay R10 trips the relays R1 to R9. When relay K becomes de-energized, relay R21 becomes energized and prepares the accumulator order for the next impulse by closing its R21b contacts.

The foregoing description has shown how a digit representation of "1" to "9" may be entered into the accumulator and also how after relays R1 to R9 are energized, the next impulse causes the energization of relay R10. This relay in turn being maintained energized when the accumulator relays R1 to R9 were restored to normal in preparation for new entries into the accumulator. The manner of providing entries into tens and higher orders need not be described in detail since it is the same as for the units order.

In the main circuit diagram (Figs. 7b and 7c), certain of the R relays have been omitted. The diagram shows merely the R1 and R2 relays, the R9 and R10 relays, the R11 and R12 relays, the R19 and R20 relays and the R21 relays.

As is customary in all accumulators provisions must be made for the effecting of carrying or transfer operations. The circuit arrangement to effect carry operation will now be explained. As was previously described above the units order passing from "9" to "0" relay R10 became energized and was maintained energized by cam contacts CC—4. During the carry portion of the cycle, carry magnet 151 is maintained energized by a circuit from line 141 (see Fig. 7c), through cam contacts CC—3, magnet 151, to line 142. The carry time in the cycle has been shown as the thirteenth index point. At this time carry magnet contacts 151a are closed and when cam contacts CC—5 (Fig. 7b) close, a circuit is completed as follows: Line 141, cam contacts CC—5 now closed, line 152 (see Fig. 7c), contacts R10c now closed, carry control contacts 151a now closed, to the tens order of the accumulator. If the tens order of the accumulator was standing on some value between 1 and 8 inclusive, the entry would be by means of the customary circuit and cause the energization of the next higher value relay. If, however, the tens order was standing on 9, a circuit would be completed as previously traced, then from the 151a contacts, through the R19c contacts, R9e contacts now closed, further contacts 151a now closed, line 153 (see also Fig. 7b) to the hundreds order of the accumulator. It will be noted that carry relay 151 is of the multi-contact type and that a pair of contacts 151a are located between successive orders of the accumulators.

Assume that the tens order has passed from 9 to 0 previous to the carry. A circuit will be completed from line 141 (Fig. 7b), contacts CC—5, line 152 (see also Fig. 7c), contacts R10c of the tens order now closed, contacts 151a now closed, line 153 (see also Fig. 7b) to the hundreds order. It is necessary to prevent the R10c contacts in this case from sending in an extra impulse to the hundreds order when they close, since these contacts are connected in the carry circuit. The de-energization of relays R1 to R9 of the tens order which occurred upon the energization of relay R10 causes contacts R9c to open, contacts R10c closed previous to the opening of the R9c contacts because such contacts make before the R10e contacts open to de-energize R9. Therefore the entry impulse will not be broken into two parts, that is to say, there will not be two impulses directed into the hundreds order. The R19c contacts are provided to prevent carrying from a lower order into the next higher when a carry impulse into the lower order has just set the accumulator from "8" to "9." Contacts R9e will be closed at this time, but the R19c contacts will be open and prevent an incorrect carry.

*Readout of amounts from the final result accumulator*

The value relays R1 to R9 for each order are provided with supplemental contacts R1k, R2k, etc. (see Fig. 7c). These contacts are wired in the circuit relation shown to the punch emitter 125. If contacts R1k, in the units, tens and hundreds orders are all shifted, the emitter will emit impulses through these shifted contacts to outgoing lines representative of an amount of 111.

*Electrical reset of final result accumulator*

Resetting or more aptly, clearing of the final result accumulator may be effected at any desired time after the carry time in the cycle by merely opening up the circuits to the various R relays.

Referring to Fig. 6, contacts 153LH—1 are provided in circuit between line 141 and 148. By opening these contacts all the R relays become de-energized causing clearing of the electrical relay accumulator.

*Circuit diagram and operation*

The machine is first plugged up in the customary way. Plug connections are first established between the brush plug-board sockets 155 (Fig. 7a) to the sockets 156 and 157. Sockets 156 are connected to the MP accumulator magnets designated 158MP and sockets 157 are connected to the 159MC entry receiving device magnets.

Figure 7A:
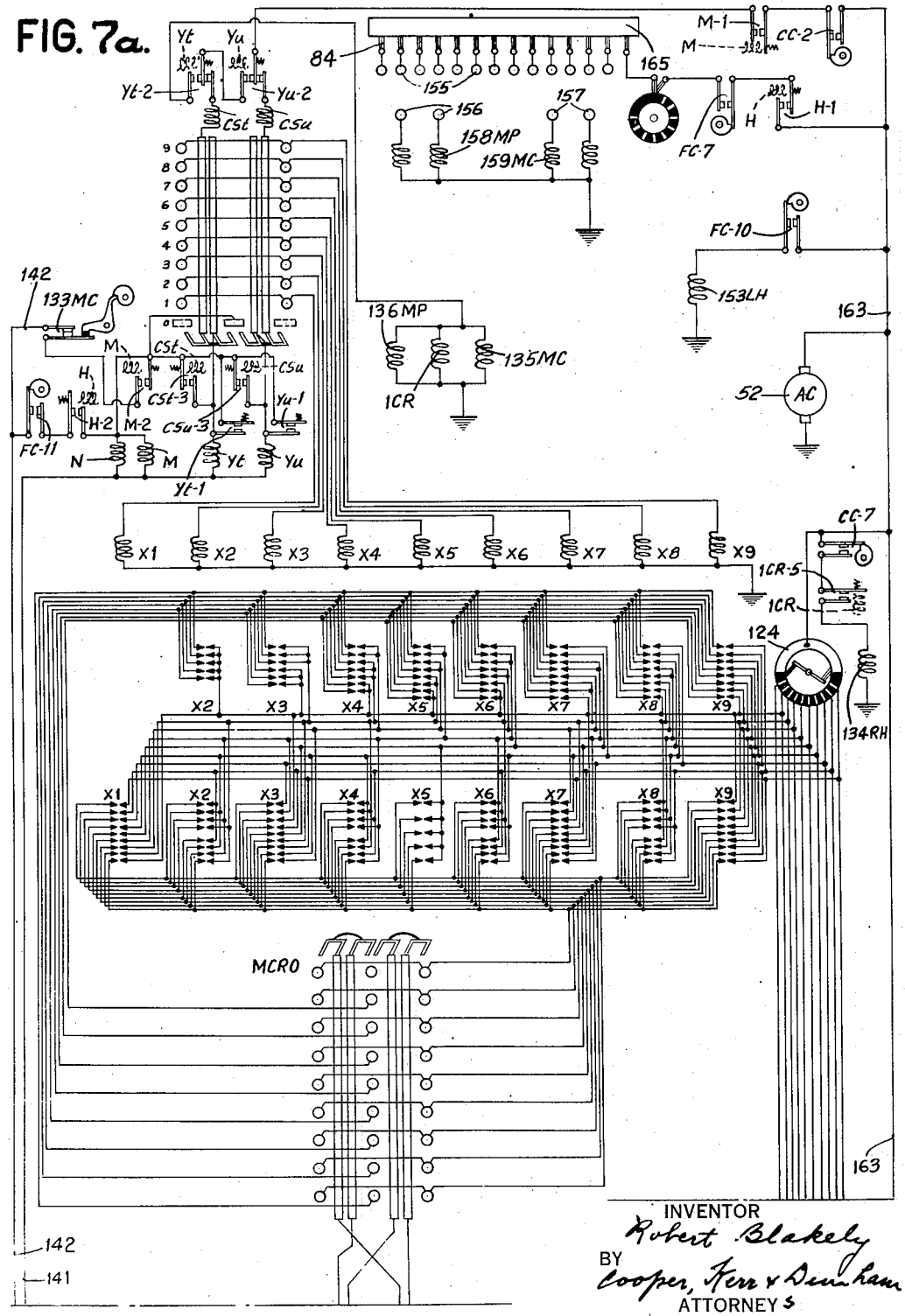
Figure 7C:
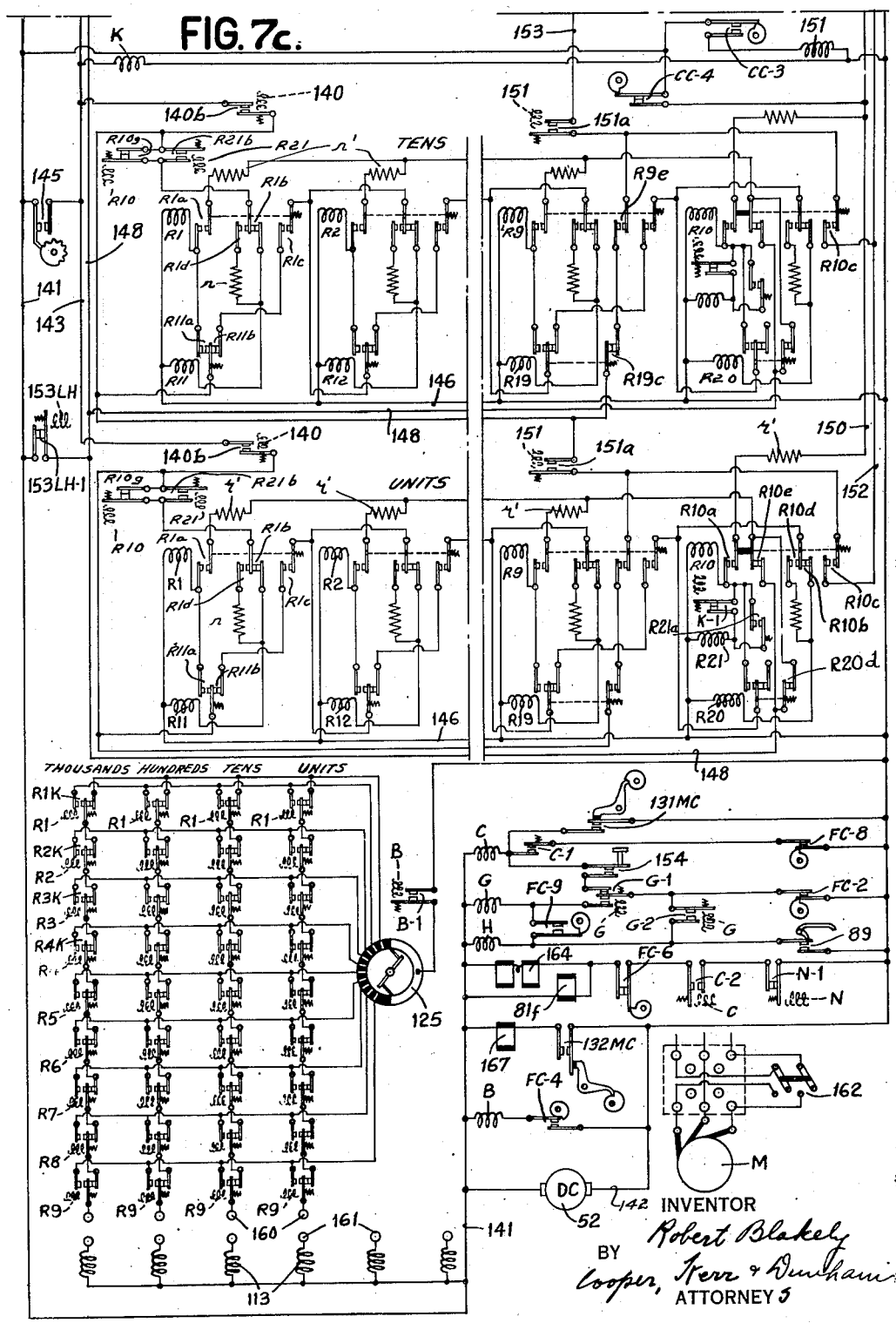

Referring to Fig. 7c, plug connections are established from sockets 160 to the proper of the 161 sockets to connect the readout contacts of the final result accumulator to the punch selector magnets 113. Pre-punched cards are then placed in the supply magazine 79 (Fig. 2). The machine operator then closes switch 162 (Fig. 7c) providing a source of current supply for the main driving motor M. The A. C.-D. C. generator 52 rotates and direct current is supplied to the D. C. buses 141 to 142. Alternating current impulses are impressed upon bus 163 and ground. Start key 154 (Fig. 7c) is now depressed which completes a circuit from line 141 through relay coil C, through the start key contacts, through relay contacts G1 in the position shown, through cam contacts FC—2 to line 142. With relay coil C energized, stick contacts C—1 and cam contacts FC8 provide a holding circuit for relay coil C. Energization of relay coil C also closes contacts C—2 and a circuit is completed traced as follows: From line 141 to card feed clutch magnet 164, cam contacts FC—6, relay contacts C—2 now closed, through the N—1 contacts now closed, to line 142. A parallel circuit is also established through the picker clutch magnet 81f. With the card feed clutch magnet 164 energized through the above circuit, card handling cycles ensue. During the starting up card feed cycle cam contacts FC—4 close to energize relay coil B. Relay coil B is utilized to provide a readout circuit upon result recording. This control is at this time ineffective because the punch mechanism is not now effective. Near the end of the first card feed cycle, card lever contacts 89 close and energize relay coil H. With relay H energized, the relay contacts H—1 (Fig. 7a) close. These contacts are maintained closed on the next card feed cycle to provide current supply for distributor 123 when cam contacts FC—7 close.

The start key must now be again depressed or alternately, it may be held depressed for the required time to start up the machine. Accordingly, another card feed cycle is initiated. The picker clutch again operates to feed the second card from the hopper into bite of the leading card feed rolls. The first card of the run will now be fed past the sensing brushes 84 and the amount of the multiplier and multiplicand will be read from the card. There will be the customary entries into the MC and MP receiving devices. The entry circuits will now be traced: From line 163 (Fig. 7a), through the now closed H—1 contacts, through the FC—7 contacts, via impulse distributor 123 to contact roll 165, thence via the brushes 84 to plug sockets 155 and via the plug connections intermediate 155 and 156 and 155 and 157 to and through the 158MP and 159MC accumulator magnets and back to ground. Factor entries are effected in the first machine cycle of the second card feed cycle (see Fig. 5). During the second card feeding cycle upon closure of cam contacts FC—9, relay G becomes energized. Upon energizing the relay coil G, the relay contacts G—1 shift, opening the start key circuit and providing a stick circuit for relay coil G in connection with the G—2 contacts which are now closed. Relay coils G and H remain energized as long as cards are feeding through the machine. When cards are exhausted, the card lever contacts 89 open, whereupon G de-energizes upon the opening of cam contacts FC—2. This same circuit control will also de-energize H.

During the first machine cycle of the second card feed cycle cam contacts FC—10 (Fig. 7a) close, energizing relay coil 153LH. The energizing circuit is from line through FC—10, through 153LH to ground. With 153LH energized, the 153LH—1 contacts (Fig. 7c) open, thereby interrupting the circuit from line 141 to line 148, thereby causing the de-energizing of all of the relays of the final result accumulator. The relays of this accumulator thereupon resume their normal de-energized relation. The machine has now reached a stage in its operation in which multiplication may be initiated. With relay coil H energized in the manner previously explained, relay contacts H—2 (Fig. 7a) become closed and upon closure of cam contacts FC—11 a circuit is established to energize relay coils N and M.

It will be assumed that the multiplier amount is 26. With a multiplier amount of 26, the cycle controller which is of the type shown in Daly Patent No. 2,045,437 will be set up. The cycle controller coils Yu and Yt will remain de-energized. Upon the first multiplying cycle, upon closure of cam contacts CC—2 (Fig. 7a), a circuit is completed from line 163, through CC—2, through M—1 now closed, through the Yu—2 contacts in the position shown, through the CSu column shift magnet, through the brush of the units order MP readout standing on 6, down to the X—6 multiplier relay magnet. The emitter 124 emits the customary partial product impulses through the contacts of the multiplier relay, impulses flowing through the MCRO readout. The right hand component impulses in the customary way energize the RH accumulator magnets designated 166RH (Fig. 7b). The LH component impulses flow through the column shift relay contacts to the proper 140 control relay magnet. These impulses set up the LH component in the relay accumulator in the manner previously described.

Another multiplying cycle now ensues. In this case upon closure of CC—2, current supply is afforded through the Yt—2 contacts to energize the CSt column shift magnet and to also energize the X—2 multiplier relay magnet. The partial product impulses flow as before, the RH component impulses going to the proper magnets of the RH accumulator, energizing magnets RH 10 and the left hand component impulses energizing the proper control magnets 140 of the LH accumulator. After multiplication is complete the Yu—2 contacts and Yt—2 contacts will have shifted to reverse position from that shown in the circuit diagram. Then upon the instant closure of cam contacts CC—2, a circuit is completed through these shifted contacts to energize the ICR relay magnet, the MC reset magnet 135MC and the MP reset magnet 136MP. With 135MC and 136MP energized, there is the customary MC and MP reset.

Energization of the electromechanical relay coil ICR closes the ICR—1 to 4 transfer contacts (Fig. 7b) in the customary way so that upon the cycle following the last multiplying cycle impulses may be emitted from emitter 124 (Fig. 7a) to and through the RHRO readout and through the ICR—1 to 4 contacts now closed to energize the proper ones of the 140 control relays of the final result accumulator. This operation will transfer the amount which previously stood in RH, over to the final result accumulator, setting up the proper relays therein to represent the sum of the LH and RH components of products.

During the cycle in which RH to LH transfer occurs, upon closure of cam contacts CC—7, a circuit is completed through these contacts, through the ICR—5 contact now closed, to energize the 134RH reset magnet. Energization of 134RH brings about reset of the RH accumulator. While reset is initiated during the transfer cycle actual reset occurs in the following machine cycle. Upon MC reset contacts 133MC open to break the holding circuit for the M and N relays which was provided by stick contacts M—2. M and N then de-energize.

Referring to Fig. 7c, upon MC reset, contacts 131MC re-close to re-energize relay coil C and initiate a new card feed. Upon MC reset contacts 132MC close to energize punch clutch magnet 167. Upon energization of C, card feed clutch 164 is re-energized and during this new card feed cycle, punching operations are effected upon the preceding card of the run. As previously explained, during a card feed cycle, relay magnet B was energized. With relay magnet B energized, relay contacts B—1 (Fig. 7c) are closed, affording current supply to punch emitter 125 from line 142. The emitter 125 emits impulses through the readout contacts of the R1 to R9 relays, i. e. contacts such as R1k to R9k. The impulses as selected by the relay contacts, flow to plug sockets 160, thence via plug connections to the plug sockets 161, the impulses flowing to the punch selector magnets 113.

Punching operations then ensue in the manner previously explained.

In view of the fact that the LH accumulator or final result accumulator is of the relay type clearing of this accumulator can be and is effected during the same machine cycle in which an amount is being read out from the accumulator. As shown in the sequence diagram (Fig. 5) such reset occurs late in the cycle after the carry time in such cycle. Inasmuch as the final result accumulator is cleared in the first machine cycle of a card feed cycle, multiplying operations can ensue in the machine cycle immediately following, viz. in the second machine cycle of the card feed cycle. A further machine cycle is required for RH to LH transfer and MC and MP reset. Accordingly, the present machine is capable of computing and recording at a rate of two machine cycles per card plus the number of partial product entering cycles required for the number of significant digits in the multiplier. For a 2 digit multiplier, complete card handling calculating and recording can be effected at a rate of four machine cycles per card. Previous machines of the type shown in Daly et al. Patent No. 2,045,437, would require six machine cycles per card and if such Daly machine was modified to utilize a gang type of punch five machine cycles per card would be required for a 2 significant digit multiplier. Accordingly, the present machine is one cycle per card faster than previous machines in the art.

Referring to the timing diagram (Fig. 4) and comparing with the timing diagram (Figs. 14b and 14c) of Bryce Patent No. 2,106,477, it will be noted that the interposer timing and punch operating timing has been slightly modified with the instant construction. Both the interposer advance afforded by cam 106 and the actuation of the punches through the card afforded by punch cams 107 is slightly advanced. Punching will have been completed prior to the closure of cam contacts FC—10 which initiate and cause instant clearing of the final result accumulator.

It will be furthermore appreciated that while clearing of the final result accumulator has been shown following actual punching and following the retraction of the punches from their advanced position through the card, such clearing of the final result accumulator could be still further advanced. It is only essential that clearing of the final result accumulator occurs following the selected energization of the punch selecting magnets 113.

Referring further to the timing diagram (Fig. 4) it will be noted that the card stop 117 has been slightly modified in its time of operation over that shown in the Bryce patent. This change in card stop timing has been made due to the fact that with the present machine cards are fed on alternate successive machine cycles. Accordingly, the card stop 117 is maintained up for one cycle. It is depressed before the beginning of the following machine cycle and again elevated toward the end of that cycle.

According to the present invention and as shown in the sequence timing diagrams (Figs. 4 and 5) record sensing operations on a succeeding or following record are effected in the same machine cycle in which recording or punching of a product is effected on a leading record. Furthermore, the clearing of the final product accumulator is effected instantaneously and in the same machine cycle in which the previously computed product is punched or recorded by the recording mechanism. This timing relation permits initiation of a multiplication of factors sensed from a following record to be effected in the same machine cycle in which the factors were read from said record and in the same machine cycle in which a previously computed product pertaining to a leading record was recorded upon such leading record. Since multiplication is initiated during the first machine cycle of a record feed cycle, actual multiplication of the factors may be effected during the second machine cycle of a record or card feed cycle. With the present machine there is what may be termed "concurrent feeding, record sensing and record punching operations" in the same machine cycle. There is also a concurrence of record sensing, initiation of multiplication and clearing of the final product accumulator in the same machine cycle. Record feed is also concurrent with a multiplying cycle.

Thus it will be seen that by utilizing an instantaneously clearable accumulator, the several steps of operation required for a completion of a multiplication of factors sensed from a record and for the recording of a product thereon have been condensed to eliminate extra machine cycles which have heretofore been required in previous machines of this general type.

What is claimed is:

1. In a record controlled cyclically operable machine of the class described, with sensing means to sense factor data represented on records, factor receiving means controlled thereby to receive the sensed factor data, multiplying mechanism effecting multiplication of one factor by a digit of the other factor in the course of a single machine cycle under control of the receiving means, and recording mechanism including selectable elements for determining data recording, the combination of an instantaneously clearable final product relay type of accumulator for selecting the elements of the recording mechanism so as to determine recording of the final product, a main cyclically operating mechanism, intermittently operable record handling means operated in synchronism therewith for handling a succession of records in a run, and including means to advance the records at a time, first to the sensing means to be sensed for factor data during a machine cycle, and thereafter into the recording mechanism to be recorded on during a subsequent machine cycle with the final product, timed means operated by the elements of the record handling means for causing recording to be effected on a record advanced into recording position in the recording mechanism during the same machine cycle in which the following record is being sensed for new factor data, and timed means also operated by the elements of the record handling means for causing the instantaneous clearing of the relay type of accumulator after the said elements of the recording mechanism have been selected thereby and during the same machine cycle in which the recording is being effected on one record and while the following record is being sensed for new factor data.

2. A machine according to claim 1, wherein an extra space is disposed between the sensing means and recording mechanism to accommodate a following record during record feed while the leading record is maintained in recording position in the recording mechanism.

3. The machine as defined in claim 1, including means for maintaining the leading record in recording position stationary while the following record is being sensed and while the latter record is being advanced from the sensing means to the recording mechanism, with the sensing means and the recording mechanism being at least a record space apart so as to enable the said following record to be completely advanced past the sensing means and fed into a position in advance of the recording means while the leading record still is maintained in recording position, and timed means effective upon completion of the recording operation for causing the record in recording position to be discharged from the recording mechanism and the following record to continue its uninterrupted advance from the sensing means across said space and then into the recording position.

4. A machine according to claim 1, wherein timed means operated by elements of the record handling means are provided to initiate multiplication by the multiplying mechanism during the same machine cycle in which the factors to be multiplied are sensed on the aforesaid following record but after the sensing operation and during which same cycle the clearing of the said accumulator of its previously accumulated final product is effected.

5. In a cyclically operable record controlled machine of the class described, with factor receiving means, a multiplying mechanism effecting multiplication of one factor by a digit of the other factor in the course of a single machine cycle under control thereof, and a recording mechanism for recording final products, the combination of a relay type instantaneously clearable final product accumulator for selectively controlling the recording mechanism in accordance with final products, record handling means including means for feeding successive records through the machine in three record handling operations for each record, the first operation transferring a record from a record supply station to a sensing station, the second operation advancing said record from the sensing station to a recording position in a recording mechanism, and the third operation discharging the record from the recording mechanism, means for initiating operation of the record handling means and of the recording mechanism upon completion of a multiplication of factors from a record while this record is in the recording mechanism and while a succeeding record is in such a position that it is about to be advanced through the sensing station whereby the said succeeding record will be fed into the sensing station to be sensed for new factor data while the preceding record in the recording mechanism is being recorded upon with the product of the factor data derived therefrom, means for retaining the latter record in recording position to permit recording thereon while the record handling means functions and while the said succeeding record is being advanced from the sensing means towards the recording mechanism, means controlled by elements of the record handling means to cause clearance of the product accumulator after it has completed its control of the recording mechanism, means comprising elements of the record handling mechanism for causing the record advancing means to resume the advance of the record in the recording mechanism after recording operations so as to discharge the latter record from the recording mechanism and so that the following record may be fed to the recording position, and means controlled by elements in the record handling means for initiating a multiplication of the factors sensed from the succeeding record while it is being fed towards the recording mechanism; said recording operation, said clearance of the final product accumulator, and said multiplication initiation being effected within the same machine cycle.

6. In a record controlled cyclically operable machine of the class described with factor receiving means, a multiplying mechanism effecting multiplication of one factor by a digit of the other factor in the course of a single machine cycle under control thereof, and a recording mechanism for recording final products, the combination of a relay type instantaneously clearable final product accumulator, record handling means for feeding successive records through the machine in three card handling operations for each record, the first operation transferring a record from a stack to a sensing station, the second operation advancing said record through the sensing station to the recording mechanism, and the third operation discharging the record from the recording mechanism, means for initiating operation of the record handling means and of the recording mechanism upon completion of a multiplication of factors from a record while said record is in the recording mechanism and while a succeeding record is at the sensing station, stop means for retaining said record in the recording mechanism to permit recording thereon while the record handling means functions and while a record is being fed through the sensing means, means controlled by elements of said record handling means to cause clearance of the product accumulator following recording, means comprising elements of the record handling means for moving said record stop means to release the record in the recording mechanism so that the following record may be fed thereto, and means controlled by elements of said record handling means for initiating multiplication of the factors sensed from the succeeding record while said record is being fed to the recording mechanism, said recording, clearance of the final product accumulator, and initiation of a multiplying operation being effected concurrently in a single machine cycle.

ROBERT BLAKELY.

Patent No. 2,264,612.  December 2, 1941.

ROBERT BLAKELY.

It is hereby certified that error appears in the printed specification of the above numbered patent requiring correction as follows: Page 8, first column, line 41, claim 1, after "records" insert --one--; and that the said Letters Patent should be read with this correction therein that the same may conform to the record of the case in the Patent Office.

Signed and sealed this 20th day of January, A. D. 1942.

(Seal)

Henry Van Arsdale,
Acting Commissioner of Patents.